United States Patent [19]

Genis et al.

[11] 4,091,583
[45] May 30, 1978

[54] WALL OF PRESSURIZED REINFORCED CONCRETE TANK

[76] Inventors: Semen Naumovich Genis, ulitsa Krjukovskaya 23, kv. 33, Moscow; Adolf Nikolaevich Zhivov, ulitsa Sverdlova 13, kv. 14, Kiev; Nikolai Alexandrovich Pereyaslavtsev, ulitsa Bolshaya Podvalnaya 14, kv. 76, Kiev; Igor Vladimirovich Sukhenko, ulitsa Narodnaya 6/31, kv. 20, Kiev; Nadezhda Grigorievna Vasyagina, ulitsa Bereznyakovskaya 16a, kv. 108, Kiev; Viktor Ivanovich Shotsky, ulitsa Borchagovskaya 117/125, kv. 45, Kiev, all of U.S.S.R.

[21] Appl. No.: 634,630

[22] Filed: Nov. 24, 1975

Related U.S. Application Data

[63] Continuation of Ser. No. 536,447, Dec. 26, 1974, abandoned.

[51] Int. Cl.$^2$ ............................................. E04B 1/32
[52] U.S. Cl. ....................................... 52/81; 52/224; 52/249
[58] Field of Search ................... 52/224, 245, 249, 80, 52/81, DIG. 10

[56] References Cited

U.S. PATENT DOCUMENTS

| 1,086,295 | 2/1914 | Hillman | 52/224 |
| 1,940,401 | 12/1933 | Dischinger | 52/80 |
| 2,260,307 | 10/1941 | Ferris | 52/224 |
| 2,918,992 | 12/1959 | Gelsovage | 52/81 |
| 3,180,057 | 4/1965 | Pritzker | 52/224 |
| 3,292,317 | 12/1966 | Barrett | 52/224 |
| 3,300,916 | 1/1967 | Pritzker | 52/224 |
| 3,300,921 | 2/1967 | Middendorf | 52/224 |
| 3,568,385 | 3/1971 | Cruset | 52/224 |
| 3,589,088 | 6/1971 | Seidl | 52/224 |

FOREIGN PATENT DOCUMENTS

| 784,948 | 5/1968 | Canada | 52/DIG. 10 |
| 1,458,056 | 11/1966 | France | 52/DIG. 10 |

OTHER PUBLICATIONS

Eng. News Record, Apr. 29, 1954, pp. 61, 62.

Primary Examiner—Ernest R. Purser
Assistant Examiner—Henry Raduazo
Attorney, Agent, or Firm—Holman & Stern

[57] ABSTRACT

A characteristic feature of the wall according to the invention consists in that it is composed of two parts of which the outer part defining the shape of the tank is prestressed, and the inner part is supported by the outer part and composed of arcuate portions adjoining each other, the surface of each portion, which faces the internal space of the tank, comprising a portion of a convex surface of revolution.

7 Claims, 15 Drawing Figures

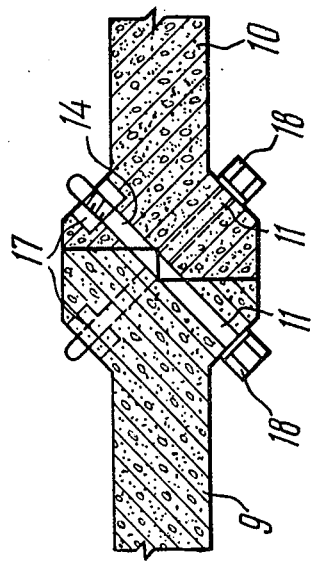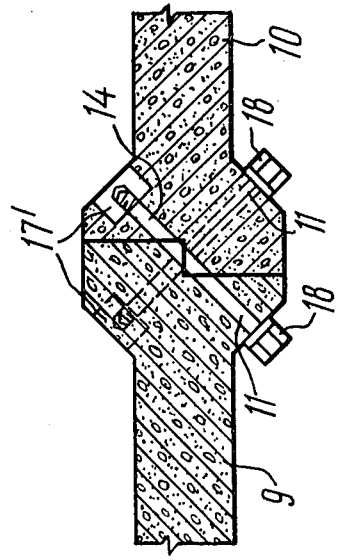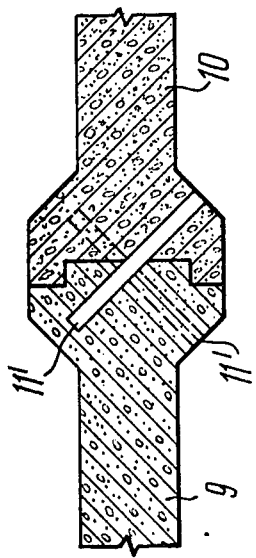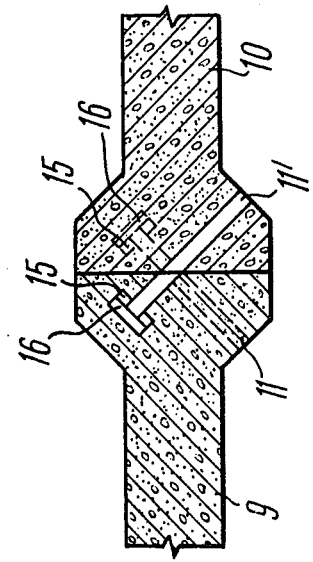

4,091,583

WALL OF PRESSURIZED REINFORCED CONCRETE TANK

This is a continuation of application Ser. No. 536,447 filed Dec. 26, 1974 and now abandoned.

BACKGROUND OF THE INVENTION

The present invention relates to the construction of pressurized tanks of considerable size, such as the protective envelopes of nuclear reactors for nuclear power plants, gas holders and other containment structures having to withstand pressure of the order of 5 atm, and, more particularly to a wall of a pressurized reinforced concrete tank.

One of the main requirements of nuclear power plants is the guarantee of their safety during operation. The most widely used and reliable method of ensuring this requirement is the installation of a nuclear reactor and systems of the first (radioactive) circuit in a sealed protective envelope. In case of rupture of a pipeline or other failure in the first circuit, accompanied by leakage of heat-transfer medium, a gauge pressure is built-up within the protective envelope, and the envelope thus becomes a pressurized tank. It should be noted that not only must the gauge pressure be absorbed by the envelope walls, but sealing of the walls must be ensured.

With the growth of power output of nuclear reactors, the quantity and parameters of heat-transfer media increase, and the pressure developed within the protective envelope in emergency situations also increases.

At present, the main constructional material for protective envelopes of nuclear reactors having a power output of 500 MW and more is prestressed concrete. Envelopes for nuclear reactors which are made of prestressed concrete and which have cylindrical walls, a flat bottom wall and a flat or arcuate covering have found wide application.

The wall concrete is generally prestressed by the use of annular (transverse) and longitudinal reinforcements placed in ducts formed in the wall. The protective envelopes in reactors of nuclear power plants in the USA and Canada have such a construction.

In the known protective envelopes, tensile stresses are developed over the entire cross-section of the wall. These stresses may cause the formation and opening of cracks upon an increase in pressure, and result in an unsealing of the protective envelope. Unsealing of the protective envelope of a nuclear reactor during emergency conditions is extremely dangerous since radioactive pollution of the environment may occur.

Prestressing of the envelope wall improves the cracking resistance of the structure. However, due to errors in the prediction of maximum pressure value in the tank under emergency conditions, as well as due to other factors, the prestressing cannot completely prevent the cracks from opening.

Known protective envelopes are cast in place. The introduction of industrial methods to the construction of pressurized tanks by using prefabricated reinforced concrete members requires the prestressing of joints between the prefabricated members forming the walls thereof. Prestressed joints tensioned by means of bolt fasteners appear to be most promising since they may be assembled using portable power tools. Known flange bolt joints for joining prefabricated members including flanges and tensioning bolts are rather unsuitable because, in the course of operation, access to the bolts mounted at the inside part of the wall for inspection and tightening is difficult or even absolutely impossible.

SUMMARY OF THE INVENTION

It is an object of the invention to provide a wall of a pressurized, reinforced concrete tank having a construction which ensures a high cracking resistance and reliability, not only in operation, but also in emergency situations.

This and other objects are accomplished due to the fact that a wall of a pressurized reinforced concrete tank according to the invention is composed of two parts. Of the two parts, the outer part defining the shape of the tank is prestressed, and the inner part is supported by the outer part and is composed of arcuate portions adjoining each other, the surface of each portion, which faces the internal space of the tank, comprising a convex surface of revolution.

When the tank is made in the form of a polyhedron having the surface inscribed in a sphere, the arcuate portions of the inner part of the wall are preferably made in the form of spherical domes. The spherical domes can comprise prefabricated reinforced concrete members mounted on preliminarily interconnected flat prestressed concrete members making-up the outer part of the wall, the prestressed concrete members being interconnected by a prestressed joint.

The wall of the pressurized tank can be made in the form of a regular prism. In this case the arcuate portions of the inner part of the wall comprise arched vaults. The arched vaults can comprise prefabricated reinforced concrete vault-shaped members mounted on prestressed concrete members which are preliminarily interconnected to make-up the outer part of the wall, the prestressed members being interconnected by a prestressed joint. The prestressed concrete members forming the outer part of the wall can comprise ribbed slabs, the ribs supporting the vault-shaped members.

Alternatively, the prestressed concrete members forming the outer part of the wall can be made in the form of L-section slabs having their wings extending at an obtuse angle with respect to each other, wherein there is provided a rib on the inner side of the wing supporting the adjacent vault-shaped members.

The prestressed joint for interconnection of prestressed concrete members forming the outer part of the wall may have several structural embodiments. One such embodiment features bolts installed in through holes extending in the body of the interconnected members in intersecting directions from the side of one member towards the opposite side of the other member through their end faces being joined. The prestressed joint preferably comprises bolts having elongate heads extending in a direction normal to the bolt axis, the bolt holes having the cross-sectional shape corresponding to the shape of these heads and terminating at the side of the bolt head in recesses having a shape also corresponding to the bolt head shape and extending at an angle with respect to the hole axis for fixing the bolt in the prestressed joint.

Cavities for rotation of the bolt head for fixing it in the joint are preferably provided in the body of joined members above the recesses. Nuts may be embedded in the body of joined members for screwing therein the bolts prestressing the joint.

The present invention consists of the following.

The construction of a wall of a pressurized reinforced concrete tank consists of two parts of which the outer part is prestressed, and the inner part is supported by the outer part and is composed of arcuate portions adjoining each other, the surface of each portion, which faces the internal space of the tank, comprising a part of a convex surface of revolution. This configuration ensures a high cracking resistance for the wall for the reasons hereinafter set forth.

Under the action of hydrostatic pressure in the tank, the arcuate portions of the inner part of the wall, which comprise spherical domes where the tank is in the form of a polyhedron or vault-shaped members where the tank is in form of a regular prism, will always be in the compressed state, and the compression thereof becomes stronger as the value of this pressure becomes greater. Due to a permanent compression of the inner part of the wall the possibility of crack formation therein is completely eliminated both in operation and in emergency situations.

In the prefabricated embodiment of the wall of a pressurized reinforced concrete tank, the prestressing of the entire outer part of the wall is achieved by prestressing both single members during manufacture thereof and of the joints.

The most advantageous embodiment of the pressurized tank is a polyhedron having the surface inscribed in a sphere causing the outer part of the wall to have this shape. Since the arcuate portions of the inner part of the wall are supported by the flat portions of the outer part thereof (sides of the polyhedron), the support reactions will result only in tension of the outer part, which tension may be compensated for by prestressing, rather than in bending as the case might be with a curvilinear shape of portions of the outer part of the wall. The same is true for a tank in the form of a regular prism.

The principle of prefabricated building in constructing pressurized reinforced concrete tanks permits the employment of various modifications of both component members thereof and of the joint fasteners. It should be noted that the dimensional proportioning of members of the outer and inner parts of the wall is selected in such a manner that the pliability of the inner part should ensure the persistance of compressive stresses at the joints in the ultimate strength state.

The embodiment of the prestressed joint for prefabricated reinforced concrete members for the outer part of the wall which comprises bolts installed in through ducts made in the body of the joined members is employed where the bolts may be tightened by means of a tool mounted outside the wall.

Use in the prestressed joint of bolts having an elongated head extending in a direction normal to the bolt axis, which axis extends in the duct having cross-sectional dimensions corresponding to the head dimensions and is fixed by rotating it about the axis with the head in a corresponding recess, permits withdrawal and replacement of the bolt in the course of operation from one side of the wall. Where the provision of through ducts for bolts in the prestressed joint are undesirable, the problem may be solved by installing the bolts in blind ducts having recesses for rotation of the bolt head, or by embedding nuts in the body of the joined members.

BRIEF DESCRIPTION OF THE DRAWINGS

The invention will be better understood from the following detailed description of specific embodiments of the wall of a pressurized reinforced concrete tank according to the invention with specific reference to the accompanying drawings, in which:

FIGS. 11 to 14 show various embodiments of prestressed joints with the slabs of the outer part of the wall in section transversely of the joint;

DETAIL DESCRIPTION OF THE PREFERRED EMBODIMENTS

In the following description reference is made to specific embodiments of the invention.

EXAMPLE 1

In this embodiment a protective envelope of a nuclear reactor is shaped as a polyhedron having the surface inscribed in a sphere.

Figure 1:
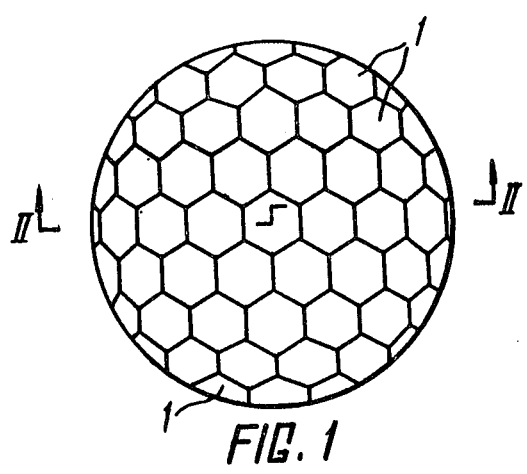
FIG. 1 is a general view of the envelope of a nuclear reactor shaped as a polyhedron.
Figure 3:
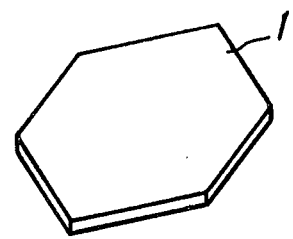
FIG. 3 is a general view of a reinforced concrete member of the outer part of the wall.
Figure 2:
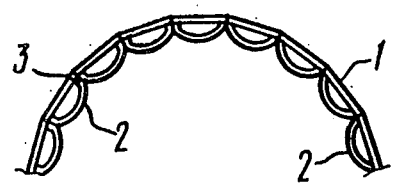
FIG. 2 is a partial sectional view taken along the line II—II in FIG. 1.
Figure 4:
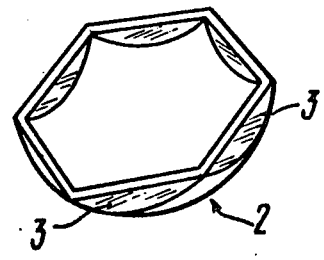
FIG. 4 is a general view of a reinforced concrete member of the inner part of the wall.

The envelope wall is composed of two parts. The outer part comprises flat prestressed concrete slabs 1 (FIGS. 1 - 3), and the inner part comprises dome-shaped members 2 (FIGS. 2 and 4) adjoining each other and supported by the respective members 1 in such a manner that the convex surfaces thereof face the internal space of the tank. Each member 2 is shaped as a dome with flat surfaces 3 provided at the sides for mating with an adjacent member 2.

When erecting such an envelope, first one slab 1 is placed "flatwise" on a preconstructed foundation. Then other slabs 1 are installed in an inclined position at either side thereof to form the first deck of a polyhedron, and all the slabs 1 are interconnected with bolts using one of the embodiments of prestressed joints shown in FIGS. 7-14. Subsequently the second deck of the slabs 1 is erected, whereafter the dome-shaped members 2 are placed inside a cup-shaped recipient thus formed and are attached by any appropriate known method, such as by welding embedded metal parts. After the erection of the slabs 1 of the third deck, the members 2 of the second deck are erected, and so on. It should be noted that, prior to the installation of the slabs of the ultimate deck and of the closing slab 1, all necessary members 2 of the inner part of the wall should be inside the tank. For access by the staff and for equipment to and from the tank, openings are provided in the wall.

EXAMPLE 2

Now reference is made to the construction of the wall of a protective envelope of a nuclear reactor shaped as a regular prism.

Figure 5:
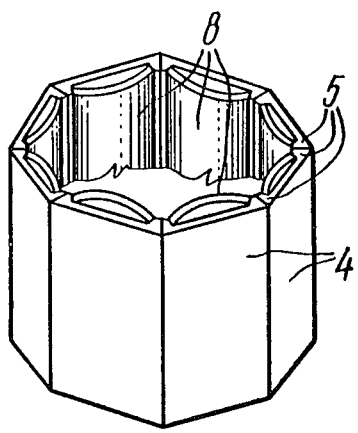
FIG. 5 is a general view of a wall of a pressurized tank shaped as a regular prism.
Figure 6:
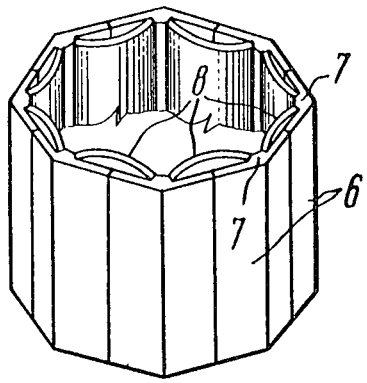
FIG. 6 is another embodiment of the wall.

The wall of this envelope is also composed of two parts; the outer part and the inner part. The outer part is composed of prestressed concrete ribbed slabs which may be flat as a slab 4 (FIG. 5) with ribs 5 at the boards, or of an L-section as a slab 6 (FIG. 6) with the wings of the L-shaped section forming an obtuse angle therebetween, a rib 7 being provided on the inner side of the slab. The inner part of the wall is composed of arched vaults 8 supported by the ribs 5,7 of the slabs 4,6, respectively.

When erecting such an envelope, all ribbed slabs 4 and 6 are installed on a preconstructed foundation with the ribs forcing inwardly in such a manner that the slabs adjoin each other. For interconnection of the slabs, one of the embodiments of prestressed joints shown in FIGS. 7 – 14 is used to obtain a transverse (circumferential) compression of the wall. Then the arched vaults 8 are mounted on the ribs of the outer part of the wall and attached thereto by any appropriate known method, such as by welding of embedded metal parts.

For complete assembly of the protective envelope of a nuclear reactor, a covering is mounted to the erected wall which may be either flat or convex. The longitudinal prestressing of the wall is effected by using rebars disposed in cavities between the flat outer members and arcuate inner members of the wall, the rebars being fixed to either the bottom wall or the covering and tensioned by any appropriate known method.

In contrast to the envelope having the wall in the form of a regular prism, the envelopes shaped as a polyhedron with the surface inscribed in a sphere appears to be the most promising and economically advantageous since a stress developed therein under the action of hydrostatic pressure within the tank is half the longitudinal stress in the wall of a prismatic tank under the same pressure.

Now reference is made to the various constructions of prestressed joints.

For the formation of prestressed joints between two reinforced concrete slabs 9 and 10 (FIGS. 7 – 14), ducts 11 are made therein during their manufacture which extend in an inclined position to the plane of the slabs 9 and 10 in such a manner that when the slabs are butt mounted, the ducts extend in intersecting directions from a side 12 of one slab 9 towards an opposite side 13 of the other slab 10 through the ends faces of the slabs which are joined. The ducts 11 in the slabs can be formed through both slabs as shown in FIGS. 7 – 10 or blind ducts (holes 11' in FIGS. 11 and 12) can be formed which extend completely through only one slab.

For assembly of the joint, bolts 14 (FIGS. 7 and 8) are installed in the ducts 11 of the slabs and tightened, using torque wrenches, from one side (from outside) of the tank wall. The bolt tension is calculated at the design stage and should provide for compression of the joint with a force at least equal to the prestressing of the reinforced concrete slabs being joined.

Figure 15:
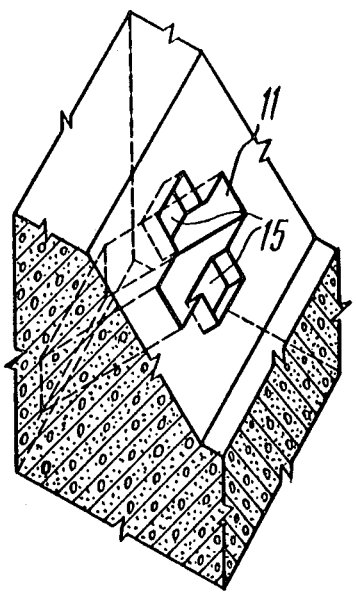
FIG. 15 is a detail view of the slab of the outer part of the wall viewed from the side thereof at the point of location of the hole opening terminating with a recess for the bolt head.
Figure 7:
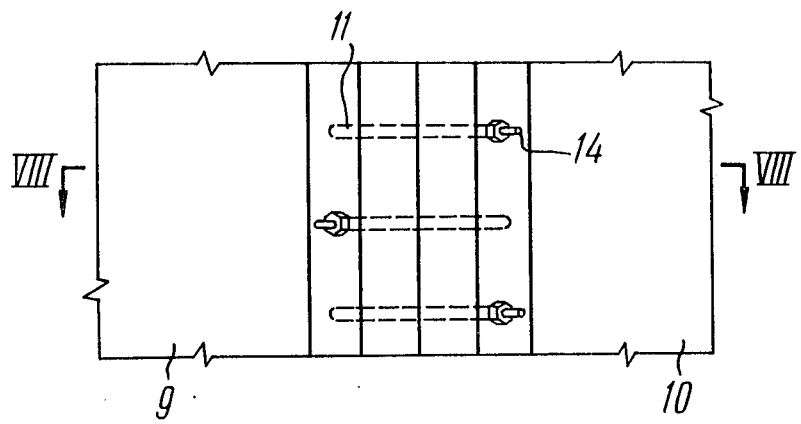
FIG. 7 is a partial front elevational view of the wall of a pressurized tank having a prestressed joint.
Figure 8:
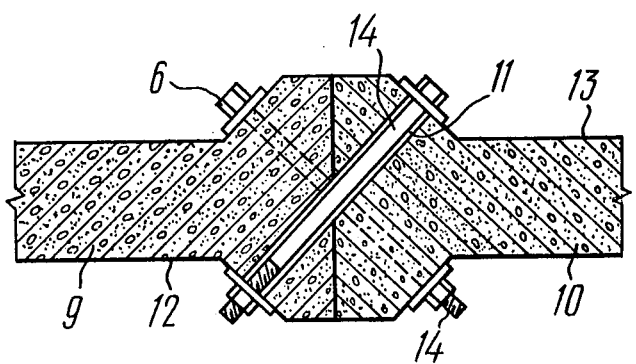
FIG. 8 is a sectional view taken along the line VIII—VIII in FIG. 7.
Figure 9:
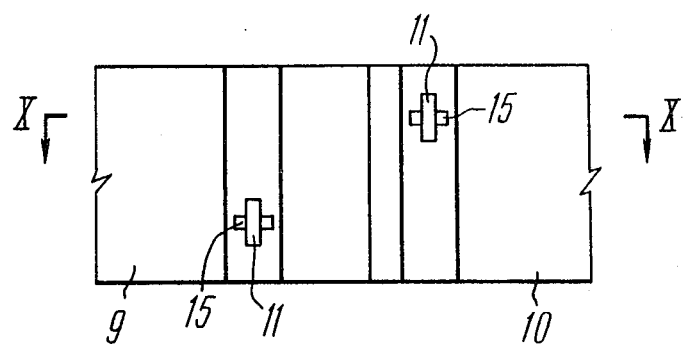
FIG. 9 is a partial front elevational view of the wall employing another embodiment of a prestressed joint.
Figure 10:
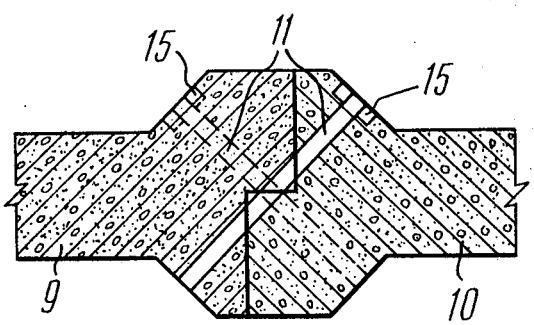
FIG. 10 is a sectional view taken along the line X—X in FIG. 9.

In order to ensure the sealing of the joint, self-sealing bolts are used, but the most reliable arrangement for the purpose are the joints made with blind ducts 11'.

Where a bolt is to be withdrawn for replacement in case of failure, the joint should preferably use bolts with elongate heads extending in a direction normal to the bolt axis (the bolt is not shown in the drawing). The cross-sectional shape of the bolt holes corresponds to the shape of such heads, and recesses 15 (FIGS. 9, 10, 15) provided on the sides of the members being joined, are shaped to correspond to the shape of the bolt heads and are located at an angle with respect to the axis of the bolt hole for fixing the bolt in the prestressed joint. In such a case the installation and extraction of the bolt are accomplished at one, outer side of the wall of a pressurized tank.

In the joints which use blind ducts for bolts with elongate heads, there are provided in the body of the joined slabs 9 and 10 cavities 16 located above the recesses 15 (FIG. 12) for rotation of the bolt head (the bolt is not shown) for fixing the bolt in the joint.

In another embodiment of the prestressed joint, nuts 17 (FIG. 13) are placed in the body of the joined slabs 9 and 10. For prestressing, the joint, the bolts 14 are installed in the ducts 11 in such a manner that their heads 18 remain outside the tank, and the bolt ends are screwed into the nuts 17. Where the tank is to be sealed, a nut 17' (FIG. 14) having a blind threaded duct is used.

We claim:

1. A wall of a pressurized reinforced concrete enclosed tank composed of two parts: a prestressed outer part defining the shape of the tank, and an inner part supported by said outer part, said inner part in a state of compression under the action of a hydrostatic pressure within said tank and comprising a plurality of reinforced concrete arcuate portions adjoining each other, the surface of each said arcuate portion comprising a part of a convex surface of revolution and facing the interior of said tank, said tank being formed in the shape of a polyhedron with the surface inscribed in a sphere, said arcuate portions being formed in the shape of dome-shaped members.

2. A wall according to claim 1, wherein the dome-shaped portions comprise reinforced concrete members of the same shape, which dome-shaped members are mounted on preliminarily interconnected flat prestressed concrete members making-up the outer part of the wall, the prestressed flat members being interconnected by a prestressed joint.

3. A wall according to claim 2, wherein the prestressed joint comprises bolts installed in through ducts made in the body of the flat members being joined, the ducts extending in intersecting directions from the side of one member to the opposite side of the other member through the end faces thereof being joined.

4. A wall according to claim 2, wherein the prestressed joint comprises bolts installed in blind ducts made in the body of the members being joined, the ducts extending in intersecting directions from the side of one member towards the side of the other member through the end faces thereof being joined.

5. A wall according to claim 3, wherein said bolts include a bolt axis and elongated heads extending in a direction normal to the bolt axis, the ducts having an axis and a cross-sectional shape corresponding to the shape of the elongated heads and terminating at the side of the elongated head in recesses also having a cross-sectional shape corresponding to the shape of the elongated head, said recesses extending at an angle with respect to the duct axis for fixing the bolt in the prestressed joint.

6. A wall according to claim 5, wherein said ducts are blind, and include an additional cavity located above the recesses for rotation of the elongated head for fixing it in the joint.

7. A wall according to claim 3, wherein there are provided nuts in the body of the members being joined for screwing therein said bolts.

* * * * *